(12) United States Patent
Grabarnik et al.

(10) Patent No.: US 10,574,588 B2
(45) Date of Patent: *Feb. 25, 2020

(54) SYSTEM AND METHOD FOR REDUCING LATENCY TIME WITH CLOUD SERVICES

(71) Applicant: INTERNATIONAL BUSINESS MACHINES CORPORATION, Armonk, NY (US)

(72) Inventors: Genady Grabarnik, Scarsdale, NY (US); Markus Klems, Berlin (DE); Larisa Shwartz, Hawthorne, NY (US); Stefan Tai, Berlin (DE); Christopher Ward, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/754,354

(22) Filed: Jun. 29, 2015

(65) Prior Publication Data

US 2015/0304241 A1 Oct. 22, 2015

Related U.S. Application Data

(63) Continuation of application No. 12/686,760, filed on Jan. 13, 2010, now Pat. No. 9,098,456.

(51) Int. Cl.
*H04L 12/915* (2013.01)
*G06F 16/23* (2019.01)
(Continued)

(52) U.S. Cl.
CPC ........ *H04L 47/786* (2013.01); *G06F 11/1464* (2013.01); *G06F 16/23* (2019.01);
(Continued)

(58) Field of Classification Search
CPC ... H04L 47/786; H04L 41/0226; H04L 67/26; G06F 17/30345; G06F 11/1464; G06F 2201/815
(Continued)

(56) References Cited

U.S. PATENT DOCUMENTS

| 5,917,997 A | 6/1999 | Bell et al. |
| 6,052,722 A * | 4/2000 | Taghadoss ............. H04J 3/1611 709/223 |

(Continued)

OTHER PUBLICATIONS

Armbrust, M., et al. Above the Clouds: A Berkeley View of Cloud Computing. Electrical Engineering and Computer Sciences. University of California at Berkeley—Reliable Adaptive Distributed Systems Laboratory. Technical Report UCB/EECS-2009-28. Feb. 2009. pp. 1-23.

(Continued)

*Primary Examiner* — Philip J Chea
*Assistant Examiner* — Wing Ma
(74) *Attorney, Agent, or Firm* — Tutunjian & Bitetto, P.C.; Samuel Waldbaum

(57) ABSTRACT

A system and method for reducing service latency includes dividing an information technology service for a customer into an infrastructure management service and a data management service. Data associated with the information technology service is stored in a backup memory. A set of infrastructure images related to the information technology service is stored at a cloud service provider. The infrastructure images are updated with software updates and hardware updates, as needed, and the data associated with the information technology service is updated through backup and restore mechanisms. The set of infrastructure images that have been updated with data with latest updates are started for recovery, continuity, testing, etc.

20 Claims, 7 Drawing Sheets

(51) Int. Cl.
*G06F 11/14* (2006.01)
*H04L 12/24* (2006.01)
*H04L 29/08* (2006.01)

(52) U.S. Cl.
CPC .......... *H04L 41/0226* (2013.01); *H04L 67/26* (2013.01); *G06F 2201/815* (2013.01)

(58) Field of Classification Search
USPC ........................................................ 709/226
See application file for complete search history.

(56) References Cited

U.S. PATENT DOCUMENTS

| | | | | | |
|---|---|---|---|---|---|
| 6,983,317 | B1* | 1/2006 | Bishop | .................. | H04L 41/065 709/223 |
| 7,315,826 | B1* | 1/2008 | Guheen | ............... | G06F 17/3089 703/27 |
| 8,352,608 | B1* | 1/2013 | Keagy | ....................... | G06F 8/63 709/220 |
| 2002/0166117 | A1* | 11/2002 | Abrams | ............... | G06Q 20/145 717/177 |
| 2002/0188711 | A1* | 12/2002 | Meyer | ................... | G06F 3/0605 709/223 |
| 2004/0006614 | A1* | 1/2004 | DiFalco | .............. | H04L 41/0893 709/223 |
| 2005/0120160 | A1* | 6/2005 | Plouffe | ............... | G06F 9/45537 711/1 |
| 2005/0149578 | A1* | 7/2005 | Sustman | ............. | G06F 11/1464 |
| 2005/0177600 | A1* | 8/2005 | Eilam | ................... | G06Q 30/08 |
| 2005/0188021 | A1* | 8/2005 | Rohland | ................. | H04L 51/30 709/206 |
| 2005/0278191 | A1* | 12/2005 | DiFalco | ................. | G06Q 10/06 705/1.1 |
| 2007/0006218 | A1* | 1/2007 | Vinberg | ..................... | G06F 8/61 717/174 |
| 2007/0043860 | A1* | 2/2007 | Pabari | ................... | G06F 9/5072 709/224 |
| 2008/0080526 | A1 | 4/2008 | Gounares et al. | | |
| 2008/0080552 | A1 | 4/2008 | Gates et al. | | |
| 2008/0082546 | A1 | 4/2008 | Meijer et al. | | |
| 2010/0077160 | A1* | 3/2010 | Liu | ....................... | G06F 3/0482 711/162 |
| 2010/0257227 | A1* | 10/2010 | McLaughlin | ...... | G05B 23/0264 709/203 |
| 2011/0126168 | A1* | 5/2011 | Ilyayev | ................. | G06F 9/5072 717/103 |
| 2013/0246922 | A1* | 9/2013 | Doerr | ...................... | H04L 41/22 715/735 |
| 2014/0250083 | A1* | 9/2014 | Wolfe | ............... | G06F 17/30315 707/652 |
| 2016/0004731 | A1* | 1/2016 | Sivasubramanian | ....................... | G06F 17/30306 707/609 |

OTHER PUBLICATIONS

Clark, C., et al. Live Migration of Virtual Machines. USENIX Association. NSDI '05: 2nd Symposium on Networked Systems Design & Implementation. Jan. 2007. pp. 273-286.

Cully, B., et al. Remus:High Availability via Asynchronous Virtual Machine Replication. NSDI. Apr. 2008. (14 pages).

Emmerich, W., et al. Grid Orchestration Using the Business Process Execution Language (BPEL). Journal of Grid Computing. vol. 3, No. 3-4. Oct. 2005. pp. 1-34.

Lagar-Cavilla, H., et al. Snowflock: Rapid Virtual Machine Cloning for Cloud Computing. EuroSys '09. Apr. 2009. pp. 1-12.

Peltz, G., et al. Web Services Orchestration and Choreography. 2003 IEEE. vol. 36, No. 10. Oct. 2003. pp. 46-52.

Reimer, D., et al. Opening Black Boxes: Using Semantic Information to Combat Virtual Machine Image Sprawl. ACM International Conference on Virtual Execution Environments. Mar. 2008. (10 Pages).

Sapuntzakis, C., et al. Virtual Appliances in the Collective: A Road to Hassle-Free Computing. USENIX Association. Proceedings of the HotOS IX: The 9th Workshop on Hot Topics in Operating Systems. May 2003. pp. 55-60.

VMWare, Inc. A Practical Guide to Business Continuity & Disaster Recovery With VMWare Infrastructure. VMWare/VMBook. Revision: Sep. 2008. (230 Pages).

Wood, T, et al. The Case for Enterprise-Ready Virtual Private Clouds. Workshop on Hot Topics in Cloud Computing. Jul. 2009. pp. 1-5.

* cited by examiner

SYSTEM AND METHOD FOR REDUCING LATENCY TIME WITH CLOUD SERVICES

RELATED APPLICATION INFORMATION

This application is a Continuation application of co-pending U.S. patent application Ser. No. 12/686,760 filed on Jan. 13, 2010, incorporated herein by reference in its entirety.

BACKGROUND

Technical Field

The present invention relates to cloud service computing environments and more particularly to systems and methods with reduced latency time in using cloud network services including continuity management, testing and other services.

Description of the Related Art

Business Continuity Management (BCM) aims at sustaining an organization's business operations without disruption. Disaster Recovery Planning (DRP) is a subset of BCM that focuses on preparing for and recovering from disasters that threaten to seriously affect information technology (IT) service availability and thereby to disrupt business continuity. IT Service Continuity Management (ITSCM) formalizes DRP from an IT Service Management (ITSM) perspective. The IT Infrastructure Library (ITIL), a widely recognized framework of ITSM best practices, describes the ITSCM lifecycle stages: Initiation, Requirements and Strategy, Implementation, On-Going Operation and Invocation.

ITSCM, particularly in distributed systems, is widely perceived as an expensive challenge for enterprise-class IT operations. The daunting complexity of resource management makes labor cost a significant factor in pursuing continuity and resiliency of a business. Predominantly small and medium businesses (SMB) are known to opt out from ITSCM due to high cost to the business in labor, hardware resources and the high price of services of external service providers. The medium and large enterprises who subscribe to ITSCM services, on the other side, fail to maintain currency of continuity plans and neglect frequent rehearsals due to high costs involved and potentially negative influences of rehearsals on production services. This failure leaves enterprises poorly prepared and jeopardizes the chances of rapid recovery in the event of a real disaster.

Bare-Metal Recovery allows backing up a computer system from and restoring it to a physical infrastructure. Flash Archive™ is a utility to clone and secure a computer system to disk or tape volumes. Hewlett-Packard® UX provides Ignite-UX™, a utility to clone and secure a computer system to network, disk or tape volumes. IBM® AIX™ offers mksysb, savevg and other utilities to clone and secure a computer system to network, disk or tape volumes. Linux based Intel® systems can use live backup mechanisms on the running system, such as file system snapshots based on logical representations of the data using the Logical Volume Manager (LVM). As an alternative to live backups, the backups can also be performed with support of the "alternate boot" method, i.e., a backup of the whole image requires rebooting the system. Windows® based Intel® systems support similar "alternate boot" backup and restore mechanisms.

All Bare-Metal Recovery techniques have a significant disadvantage: they require a similar physical infrastructure to recover on. This requirement can be fulfilled by setting up stand-by redundant physical infrastructure on a recovery site. Such a redundant site is usually provided as a service by an ITSCM service provider, and comes with a high price tag. One can further differentiate between cold, warm, hot and shared redundancy. Cold redundancy is based on an active/passive scenario with replicated hardware that must be set up and configured before it is usable. Warm redundancy is based on an active-passive scenario with pre-configured replicated hardware that must be manually brought into the system, whereas hot redundancy uses automated failover mechanisms in an active-active scenario. Shared redundancy relies on the simultaneous use of the production hardware and the replicated hardware.

Virtualization technology can be used to combine the recovery of computer systems with server consolidation, i.e., recovering physical servers on Virtual Machines (VM) that operate on a smaller pool of physical infrastructure resources. Furthermore, VM live migration and replication offers approaches to automate availability planning and ITSCM by moving workloads without service disruption. Mirage™ proposes an approach to improve inventory control of VM disk-images and fight image sprawl. One important idea of Mirage™ is to enrich VM images with metadata in a manifest that allows the separation of the storage of a VM and operations on it, such as search and update without having to start the VM.

However, these solutions introduce hypervisor dependencies and thereby might lead the customer into a technology lock-in situation. Although efforts are made to enhance hypervisor interoperability, such as the Open Virtualization Format, it is unclear how these standards can be effectively incorporated into higher-level business processes.

Recovery to virtual infrastructure can reduce the up-front cost of redundant physical hardware. However, the cost savings are limited and stand-by redundant hardware must still be provided by the customer or by an ITSCM service provider.

Cloud Computing provisions Internet-scale services which are mainly characterized by three properties: they provide means for on-demand mobilization of infrastructure resources, they exhibit the illusion of infinite amounts of resources being available, and they implement the idea of utility computing. The interest in cloud computing has been fueled by innovative Web service offerings. Customers face a number of challenges when outsourcing systems "into the cloud". For example, building secure virtualized networking solutions to complement simple cloud services to design more complex enterprise services. Other challenges come from the before-mentioned hypervisor interoperability problems. For example, VMs created with VMware cannot be brought into a system which uses VMs based on the Xen hypervisor.

SUMMARY

A system and method for reducing service latency includes dividing an information technology service for a customer into an infrastructure management service and a data management service. Data associated with the information technology service is stored in a backup memory. A set of infrastructure images related to the information technology service is stored at a cloud service provider. The infrastructure images are updated with software updates and hardware updates, as needed, and the data associated with the information technology service is updated through backup and restore mechanisms. The set of infrastructure images that have been updated with data with latest updates are started for recovery, continuity, testing, etc.

A system for reducing service latency includes an information technology service for a customer being divided into an infrastructure management service and a data management service. A backup memory for storing data is associated with the information technology service. The data in the backup memory is updated through backup and restore mechanisms. A set of infrastructure images is related to the information technology service maintained at a cloud service provider. The infrastructure images are updated with software updates and hardware updates, as needed. A service manager is configured to start the set of infrastructure images that have been updated with data with latest updates upon an occurrence of a triggering event.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
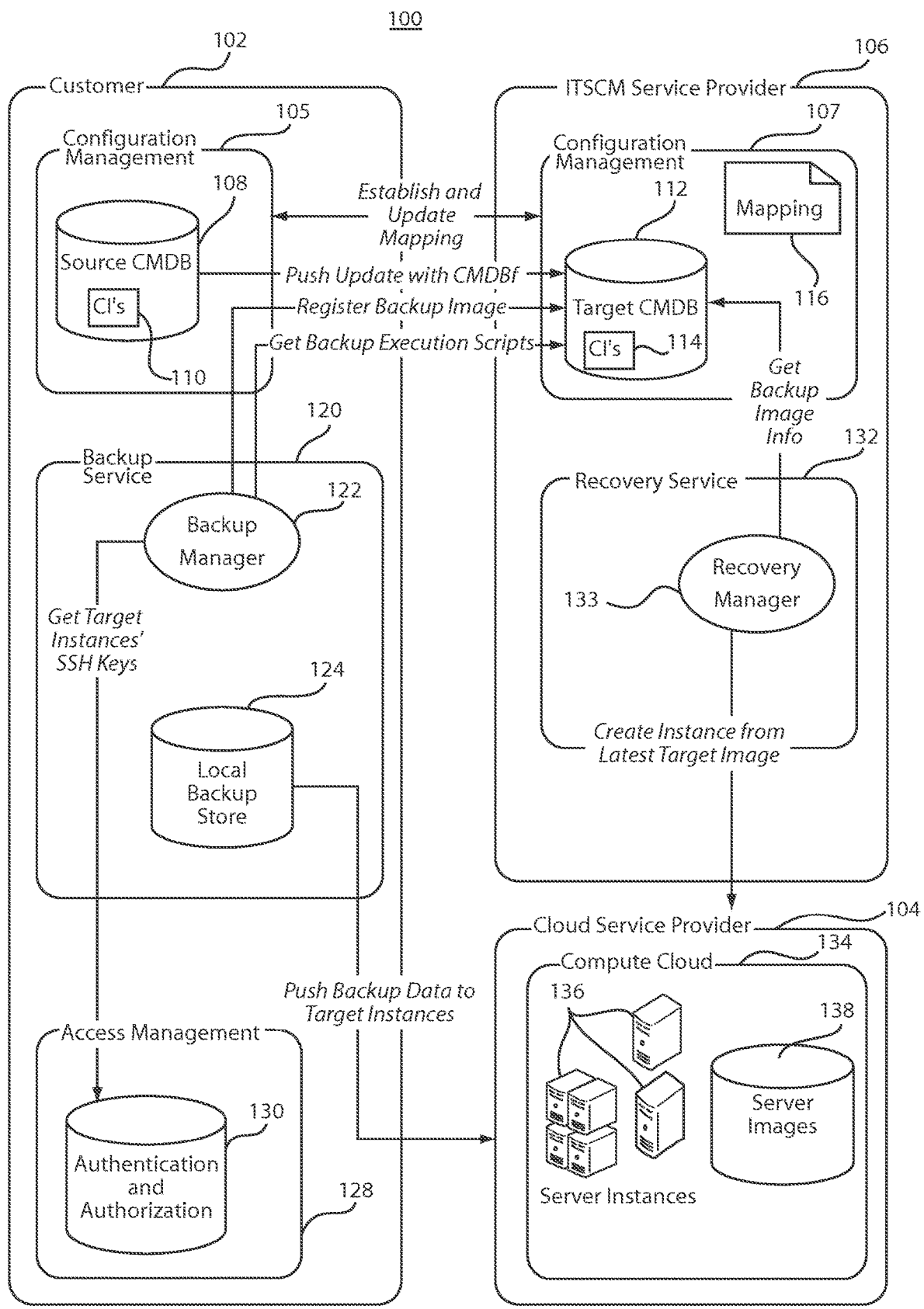
FIG. 1 is a block/flow diagram showing a system architecture and method for continuity management in accordance with an illustrative embodiment.

The present principles reduce latency time when employing cloud services. In one illustrative embodiment, information technology (IT) Service Continuity Management (ITSCM) is described that delivers the recovery of IT services in the event of a disaster. In accordance with particularly useful embodiments, cloud computing offers a model for dynamic, scalable infrastructure resource allocation on a pay-per-use basis. These attributes promise to bring cost-efficiency to ITSCM invocation and operation processes that only in the rare event of a rehearsal or an actual disaster need to allocate infrastructure resources. Web Service Business Process Execution Language (BPEL) is illustratively employed to implement standardized, testable and executable ITSCM processes. The suggested solution is described and evaluated against collected data from manual recovery processes.

The following approaches deliver ITSCM services: orchestrate cloud services with people services and supporting services to design standardized, testable and executable business processes. By using widely adopted Web technologies the present inventors design and implement these processes for "On-Going Operation" and "Invocation" stages of an ITSCM lifecycle. The present embodiments focus on data and systems recovery, which are the core objectives of any Disaster Recovery Plan (DRP); however, other applications may find utility within the scope of the present disclosure.

In systems that employ cloud services, stored images get outdated. So before the image can be used with a complex cloud service, the image needs to be updated. In accordance with the present principles, the image is replicated (restore data) every time a backup is created, then lag time to utilization is minimum in this case because the image is kept up-to-date. There is a lag time between instantiation of the image and its availability for use that in some scenarios forces a user to use an alternative method.

One approach assists ITSCM customers and service providers to develop and maintain processes that give appropriate support to service recovery teams in the event of a disaster. Surveys of a large ITSCM service provider were analyzed. The provider had resources comprising a large variety of computing systems, ranging from personal computers to clusters of servers and up to mainframe computers. This infrastructure supported services to a large scale of customer contracts. ITSCM services may be defined by two metrics that are negotiated in a contract between customer and ITSCM service provider: Recovery Point Objective (RPO) and Recovery Time Objective (RTO). RPO corresponds to the amount of business data that could be lost in a worst case disaster. RTO defines how soon the customer services must be operational again after a disaster took place. The service provider offers a large variety of services with RTO ranging from minutes to days. The cost of the provided services, and subsequently their price, grows as RTO decreases. The substantial increase in service cost when minimizing RTO is due to a need to inquire and employ new technologies or maintaining dedicated infrastructure.

Two significant challenges for ITSCM may be identified as follows: 1) Cost is a primary barrier for adoption of ITSCM, in particular for small to medium business (SMBs). The present approach minimizes cost by using cloud resources and limiting 'payable' time through a pay-per-use model for infrastructure resource utilization. 2) The complexity of the ITSCM lifecycle and lack of internal skills was another large challenge for the customers. It motivated the need for automation of ITSCM using Web standards.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DEFINITIONS AND ASSUMPTIONS: We define the object of ITSCM as an instance of an IT service that includes a Business Service Configuration Item (BSCI) and Service Business Data (SBD). The BSCI is an instantiation of the service definition and includes information on the configuration elements for supporting this service. The BSCI includes configurations of computer systems, including software installations, operating system configurations, middleware configurations, and networking. BSCIs may be organized in a dependency tree topology that may be stored in the customer's Configuration Management Database (CMDB) which we will call Source CMDB. We define SBD as valuable business-related information that is stored in the computer systems' data stores, such as databases and file systems. Similarly, the virtual infrastructure resources of the cloud service provider are described in a different CMDB which we call Target CMDB.

For our purposes, we assume that the cloud service provider has capabilities to replicate the customer's service, i.e., has assets that allow a meaningful mapping between Configuration Items (CI) in Source CMDB and Target CMDB. ITSCM services rely on existing mechanisms to replicate the customer's services for backup and recovery, among other things. We refer to the clone of an IT service as a service replica. The service replica's underlying technology can differ from the original IT service's technology, e.g., a computer system can have a different IP address or be based on different architecture. However, the service replica provides the same service from a user's point of view. Furthermore, SBD secured by backup-and-restore agents (backup agents for short) that are installed on the customer systems as well as on the service replica systems. The backup and restore actions performed by the backup agents are coordinated by a master backup agent.

Referring now to the drawings in which like numerals represent the same or similar elements and initially to FIG. 1, an ITSCM system architecture 100 and base services are illustratively shown. An ITSCM solution for a cross-organizational collaboration is implemented between a customer 102, cloud service provider 104 and ITSCM service provider 106. The cloud service provider 104 includes a compute cloud 134. The compute cloud 134 includes any number of server devices 136 and server configuration instances. A database or storage includes server images 138 which are employed to provide customized operation services to the customer 102. The customer 102 maintains a configuration management module 105 which includes a configuration management database (CMDB) 108. CMDB 108 includes current configuration items (CIs) 110 of the infrastructure that supports the customer's IT services. The ITSCM service provider 106 maintains a similar configuration management module 107 which includes a CMDB 112 with CIs 114 of the cloud service provider's virtual machine (VM) images that are used, in the event of a disaster or other event, to replicate the customer's services by pushing updates from the customer. The solution utilizes a CMDBf protocol to facilitate collaboration between customer 102 and service provider 106 in Configuration Management 105 and 107.

A mapping 116 between customer and provider Configuration Management systems 105 and 107 is established at the time of ITSCM transition to On-Going Operations and is maintained by the service provider 106.

It should be understood that the example described herein for continuity management (e.g. a data recovery service) is merely illustrative, and that the present principles are applicable to any customer service to be employed using a cloud service. For example, the present embodiments include anything that assumes a system is running in a customer's enterprise non-cloud environment. Such applications may include testing scenarios, (e.g., where a development system is in hardware and every time a change is made to the development system, the changes are synchronized to a cloud for testing). Another scenario may include expanding capacity of a service on-demand, e.g., a service which is running somewhere (on hardware or another system), and the service ensures that if the usage of the customer's service suddenly increases, then a replica of the service in the cloud (configured accordingly) permits redirection, as needed, of some of the requests to the replica of the service. The replica needs to be updated to ensure proper service and reduce latency.

A virtual machine (VM) image is a container without information on an underlying implementation (hardware or hypervisor) stored as a file. A VM instance is a running instance of this container, and it already contains information about location, etc. (IP, name, etc.).

A disaster recovery plan (DRP) is developed during an Implementation stage of the ITSCM lifecycle. Among other information, the plan includes a definition of the recovery solution for each IT service of the customer 102. Executable Business Process Execution Language (e.g., WS-BPEL 2.0, or BPEL for short) processes and needed basic services are set up prior to transitioning to On-Going Operations. Using BPEL for orchestrating grid services provides more flexible workflows than hard-coded software implementations.

Service Catalogue: ITSCM services utilize basic cloud services, supporting services, and people services all of which are exposed through an ITSCM service provider's Service Catalogue. Supporting services are used for Business Service Configuration Item (BSCI) and Service Business Data (SBD) backup, verification and recovery. People services are included to account for manual tasks, such as approval actions, manual configuration and tune-up tasks.

An information technology service for a customer is split into an infrastructure management service (e.g., service provider 106) and a data management service (e.g., backup service 120). Data associated with the information technology service is stored in a backup memory 124, which may be stored at the cloud service provider 104. A set of infrastructure images related to the information technology service are stored at the cloud service provider 104. The infrastructure images are updated with software updates and hardware updates, as needed, and the data associated with the information technology service are updated through backup and restore mechanisms. Data in the backup memory may be pushed to a target instance stored at the cloud service provider. Upon triggering, the set of infrastructure images that have been updated with data with latest updates are started. Updates to the set of infrastructure images are pushed from the customer to an infrastructure management service provider 106. A mapping 116 between configuration management of the customer 102 and the cloud service provider 104 is established such that the infrastructure management service provider 106 is sensitive to updates for the set of infrastructure images. The customer and the infrastructure management service provider employ resource management workflows that employ cloud services, and the resource management workflows are preferably independent of the cloud service provider. In this way, data and/or instances can be restored on the same system or a different system, and the type of systems employed at the cloud service provider are independent of the systems where the services are provided. Access to the data is managed to limit access by service providers and maintain the data securely.

1. Cloud Services: Cloud services are infrastructure services (Infrastructure-as-a-Service, or IaaS) that perform the allocation and deallocation of VMs. Cloud services provide scalable, on-demand access to infrastructure resources. The cloud service providers 104 offer Web service interfaces in the form of, e.g., WSDL documents to interact with their services. We create simple BPEL activities that invoke these Web services to manage, allocate, and de-allocate infrastructure resources.

2. Supporting Services: Supporting services provide for SBD backup-and-restore capabilities and BSCI replication capabilities (e.g., Backup Service 120). The Backup Service 120 is controlled by the customer 102 and includes the deployment and coordination of backup agents (e.g., a backup manage 122) on the individual production systems to be protected. The Backup Service 120 relies on the deployment of a Source CMDB that maintains currency of the customer's BSCIs. Moreover, the Backup Service 120 has access to the target CMDB 112 where backup execution scripts and information on registered backup images is stored. The Backup Service 120 includes one more local back storage devices 124. In addition to the Backup Service 120, a Verification Service or Access Management 128 can be deployed to control the integrity and consistency of SBD backups and BSCI replications. The backup manager 122 may interface with Access Management 128, which may include an authentication and authorization storage 130 to exchange security keys (e.g., SSH keys) or employ other security measures.

The ITSCM service provider 106 implements a Recovery Service 132 that the customer 102 invokes in the event of a disaster. The Recovery Service 132 can create instances from backup images and control them through cloud service provider application programming interfaces (APIs) but has no credentials to log into the VM instances. The private SSH keys that are needed for this purpose are stored in the customer Access Management databases 130. The customer can be assured that the ITSCM service provider 106 cannot access his SBD (e.g., in CMDB 108 or backup store 124). A recovery manager 133 is an agent or API capable of interacting with the cloud service provider 104 to obtain server images 138 to create a new instance from the latest target image.

3. People Services: People are an important part of a successful enforcement of a Disaster Recovery Plan. All decisions that are made and all actions taken within the course of ITSCM have an impact on business units that depend on IT as a supporting service. Risk precaution and compliance regulations need management to make informed decisions and give approval for certain actions. Given this, human tasks are included in our standardized BPEL process as people services using known standards, such as WS-HumanTask and BPEL4People.

BPEL Process Implementation: We create a set of BPEL activities that reflect main capabilities suggested with the present approach. We illustratively present BPEL implementations of single-system Backup and Recovery processes using IBM WebSphere. We concentrate on key information that is passed to the processes and that is used for cloud service invocation. The implementation was realized with cloud services provided by IBM's internal research cloud RC2. The BPEL activities that invoke the corresponding RC2 Web services can be categorized as follows.

VM image-based activities are:
create: create and save a VM image to stable storage,
update: update a VM image that is residing on stable storage, e.g., add a new kernel or ramdisk,
delete: delete the VM image from stable storage,
describe: describe the VM image, e.g. disk space, memory, etc.

VM instance-based activities are:
create: create VM instances from a VM image,
save: persist VM instances as images to stable storage,
update: update the BSCI of VM instances,
delete: destroy running VM instances,
describe: describe running VM instances, e.g. IP address, disk writes, etc.

Reporting and monitoring can be implemented through the describe activities, while image and instance administration tasks are performed with support of the other activities. Within the scope of the present embodiments, we focus on VM instance-based activities. This approach is similar to traditional warm redundancy in that we assume that pre-configured systems already exist.

The Backup BPEL process is triggered by a service request from the Backup Service 120. A "Receive Backup Request" activity has input parameters specifying access to the customer's local backup storage 124, as well as TargetImageID, and TargetImageSshKeyName. For example:

```
<bpws:receive name = "ReceiveBackupRequest" operation = "doDataBackup"
    partnerLink = "BackupService"...>
    <wpc:output>
    <wpc:parameter name = "SourceStorageEndpoint"variable="SourceStorageEndpoint"/>
    <wpc:parameter name = "SourceStorageUser" variable="SourceStorageUser"/>
    <wpc:parameter name = "SourceStoragePasswordOrKey" variable = "SourceStoragePassword"/>
```

-continued
```
    <wpc:parameter name = "TargetImageID" variable = "TargetImageID"/>
    <wpc:parameter name = "TargetImageSshKeyName"variable = "TargetImageSshKeyName"/>
    <wpc:parameter name = "BackupCommandScript"variable = "BackupCommandScript"/>
    </wpc:output>
</bpws:receive>
```

The TargetImageID is used to determine the VM image that should be instantiated. The TargetSshKeyName specifies a private SSH key that the customer controls (in storage 130); the corresponding public key is deployed with the instance and enables the customer to log into the VM instance. For example:

```
<bpws:invoke name = "CreateVMInstanceFromImage"
    operation = "createInstance" partner-Link = "CloudManagerPartner" ...>
    <wpc:input>
        <wpc:parameter name = "imageId" variable = "TargetImageID"/> ...
            securityGroup, sshKeyName, ...
    </wpc:input>
    <wpc:output>
        <wpc:parameter name = "result" variable = "CreateInstanceResult"/>
    </wpc:output>
</bpws:invoke>
```

When the instantiation is completed, the instance parameters Hostname and IpAddress are polled. Appropriate backup execution scripts are then retrieved from the ITSCM service provider's Target CMDB 112 and invoked through the customer's Backup Service 120. The customer's firewall allows the establishment of an encrypted data transfer connection between backup agents installed on the customer's production systems and backup agents deployed with the VM instances. When the data transfer is completed, the instance is saved to an image that resides on stable storage 138 at the cloud service provider 104. The instance is deleted and a report is sent back to the service requestor.

The Recovery BPEL process is triggered by a service request from the Recovery Service 132. A "Receive Recovery Request" activity has input parameters that specify the latest backup image with TargetImageID. For example:

```
<bpws:receive name = "ReceiveRecoveryRequest"operation = "doRecoveryExecution"
    partner-Link = "RecoveryService" ...>
    <wpc:output>
        <wpc:parameter name = "TargetImageID" variable = "TargetImageID"/>
    </wpc:output>
</bpws:receive>
```

An instance is created from the image. The information necessary to access the instance, Hostname, IpAddress, and TargetImageSshKeyName, are reported back to the service requestor.

Fault handling should be introduced to account for alternative paths of the BPEL process, such as failure to start an instance from an image. More sophisticated authentication and authorization procedures can be implemented with support of the customer's Access Management systems 128.

Figure 2:
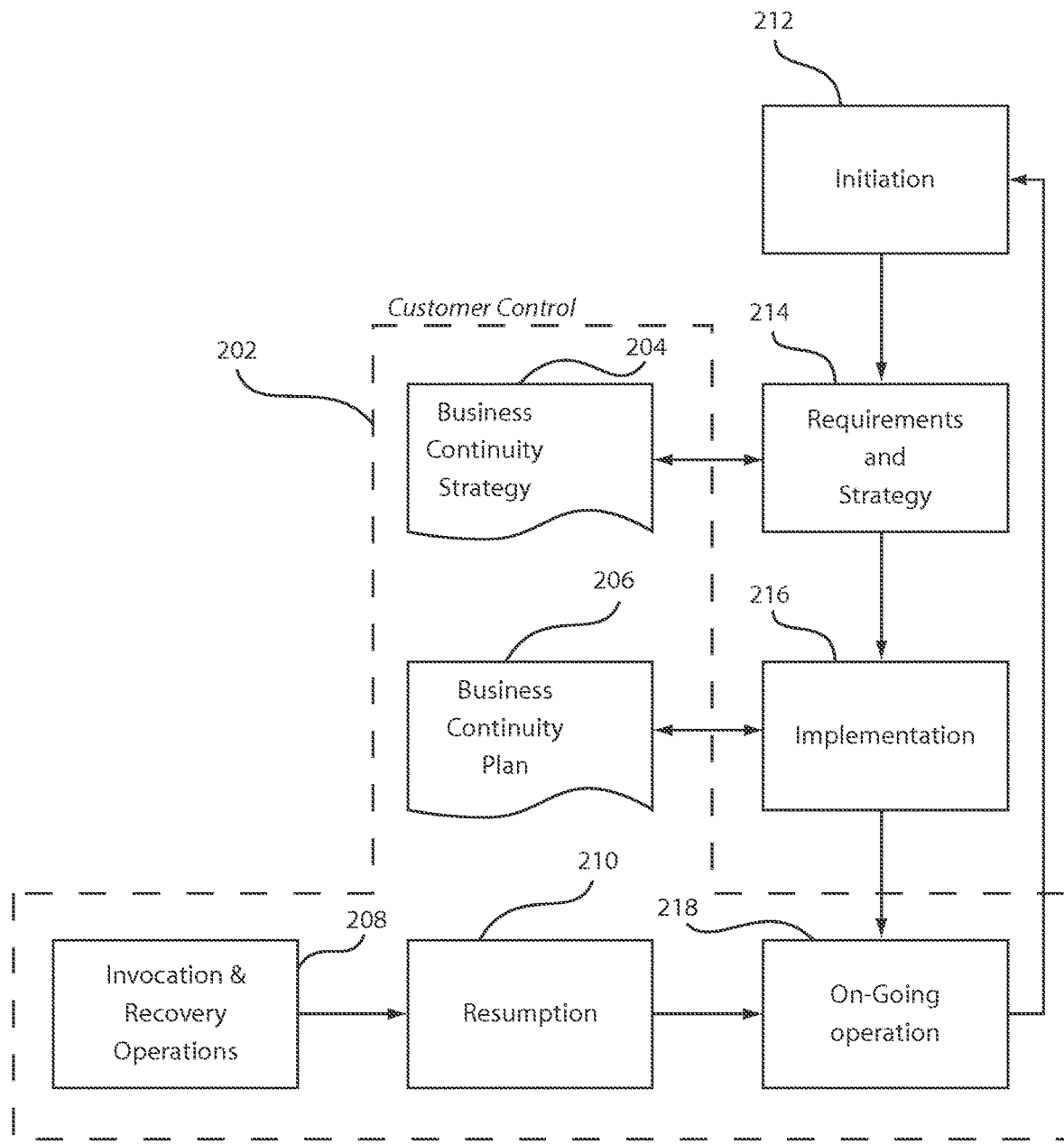
FIG. 2 is a block/flow diagram showing an IT Service Continuity Management (ITSCM) lifecycle in accordance with the present principles.

Referring to FIG. 2, a ITSCM lifecycle is shown for a High Level ITSCM Process. We focus on the delivery of ITSCM and more specifically on two stages in the ITSCM lifecycle: On-going Operations in block 218 and Invocation in block 208. A resumption process 210 is triggered when the business is ready to resume its normal IT operations. The process resembles the recovery process, except that the replication mechanisms and data flows are set up in the reverse direction, i.e., from the cloud services to the (new) production site.

In particular, focus is on such critical activities as maintenance of currency and execution of DRPs. These activities are in an immediate need of automation due to reasons such as lack of focus on ITSCM procedures during On-Going Operations 218 by a customer's personnel and difficulty in locating such personnel during Invocation 208. IT services are replicated "in the cloud". The BSCI replication method is used to recover the BSCI information of a service, whereas backup agents are used to recover the SBD. Both recovery activities result in a backup service replica, i.e. a backup VM image, which is hosted "in the cloud". In addition to blocks 208, 210 and 218, a customer controls (202) a business continuity strategy 204 and a business continuity plan 206. The strategy depends on the type of business, importance/priority criteria, cost, etc. The plan 206 is the way in which the customer desires the strategy to be carried out. In block 212, an initiation of the process is begun. This includes determining policies, scope of the project, etc. In block 214, requirements and strategy are outlined based upon customer needs and the strategy 204 set forth by the customer. This may include a business impact analysis, risk assessment, continuity strategies, etc. In block 216, implementation of the business continuity plan is carried out. This includes the development of such plans, recovery plans and procedures, organization planning, testing, etc.

Implementation & Transition to On-Going Operations: The following activities have to be completed to instantiate ITSCM services after an implementation stage in block 216 has been completed and a transition to On-Going Operations 218 takes place.

First, a document mapping between the Configuration Management Service Catalogues of customer and ITSCM service provider is established. In On-Going Operations, this mapping uses CMDBf's policy for propagating BSCI changes from Source CMDB to Target CMDB. It is within the responsibility of the customer to assure that changes to the Source CMDB are reflected in the Target CMDB in time.

Adequate BSCI replication methods and SBD backup methods, such as setting up VMs with security tokens, installing backup agents, etc., is established and base services are deployed. Storage for SBD backups is allocated and the registration mechanism is set up. Roles participating in the ITSCM processes are defined and users are assigned to these roles. ITSCM BPEL processes are deployed.

Figure 3:
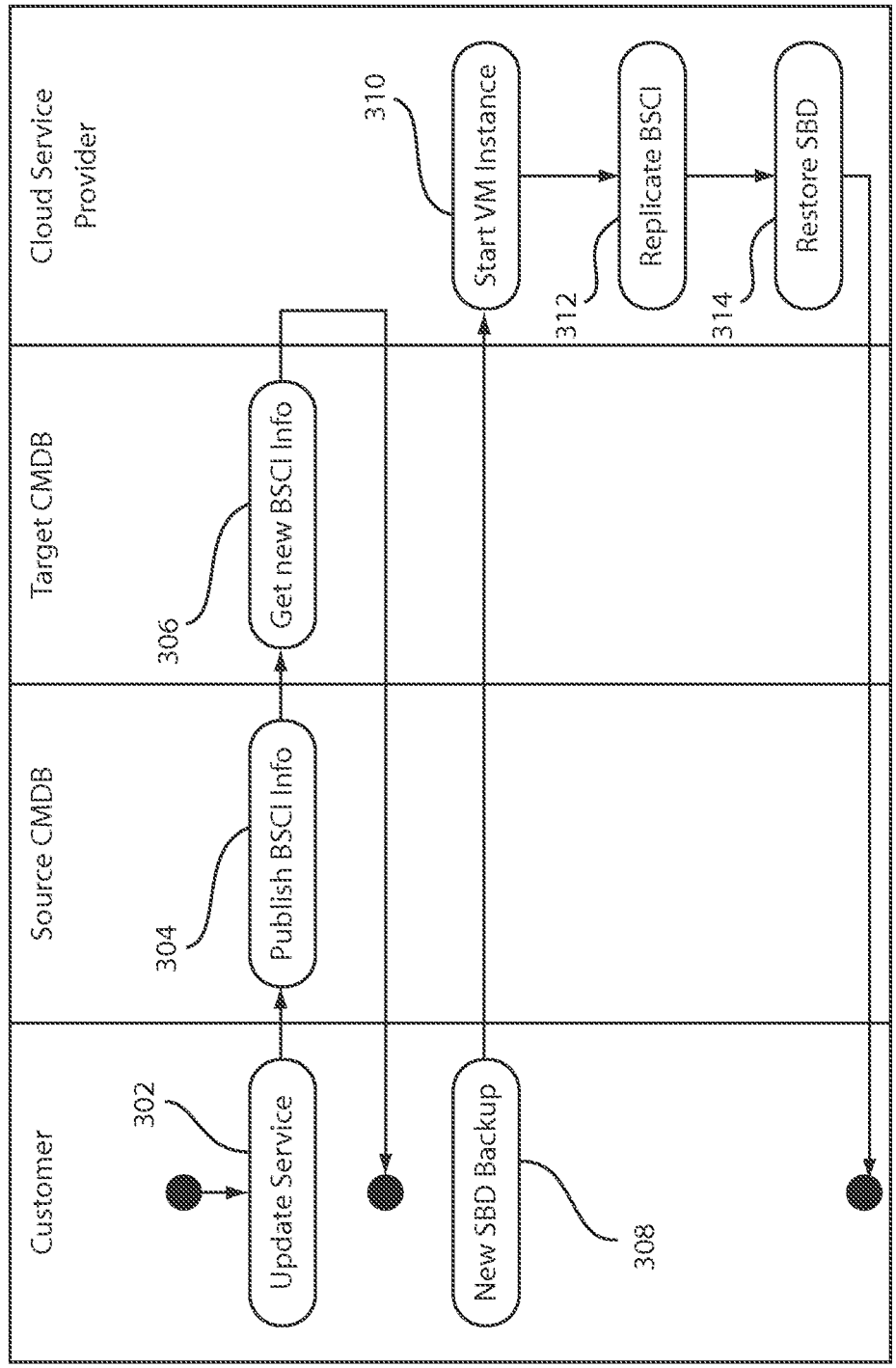
FIG. 3 is a block/flow diagram showing an illustrative method for carrying out on-going operations in accordance with one example.

Referring to FIG. 3, a flow chart for On-going Operations 218 is illustratively shown. This is the most time consuming and, based on surveys, a weakest part of the ITSCM lifecycle, because it needs constant attention. Hence, time spent in its activities adds multiple times to the overall cost, and inconsistencies in the stage could cause failure of recovery. During On-going Operations 218, both the service's BSCIs and SBD change. The SBD grows with the number of customer's computer systems, users, and time. From a business perspective, the SBD includes inherent business value, such as business knowledge, customer data, financial data, etc. The BSCIs changes over time, as well, although they do not necessarily grow in size. The BSCIs do not include inherent business value. However, without the BSCI information, it may not be possible to recover the production services from a disaster within the bounds of the RTO as specified in the contract between customer and ITSCM service provider.

In block 302, a customer (102) desires to update a service. The source CMDB (108) publishes new BSCI information in block 304. The target CMDB (112) gets the new BSCI information and provides the service to the customer (102) in block 306. For the SBD, SBD backup is generated by the customer in block 308. The cloud service provider (106) starts a virtual machine instance, in block 310, replicates the BSCI in block 312 and restores the new SBD in the replicated BSCI in block 314. The SBD storage is reported to the customer.

Figure 4:
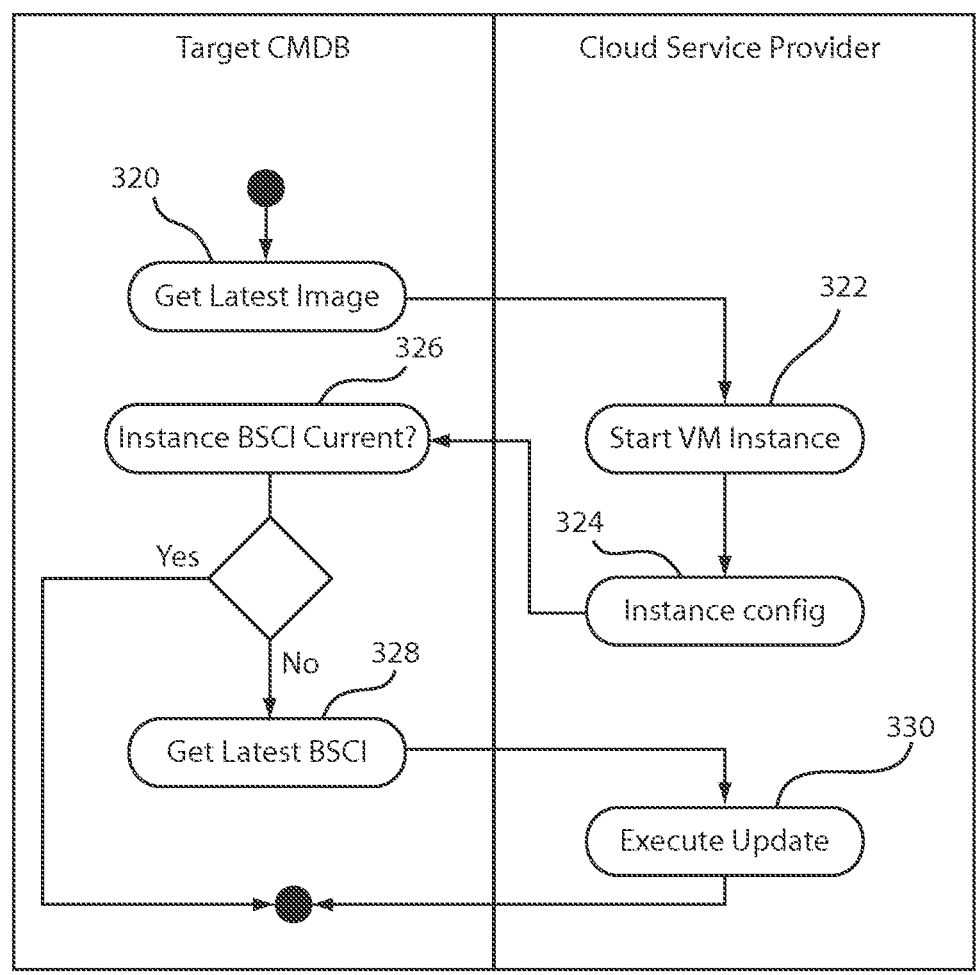
FIG. 4 is a block/flow diagram showing an illustrative method for a BSCI replication process in accordance with one example.

Referring to FIG. 4, a BSCI Replication Process (block 312) is illustratively shown. The BSCI Replication process is triggered based on two conditions: the SBD backup was received by the provider (customer), and a check of the Target CMDB revealed that there is no known image (at the cloud service provider) associated with current BSCI information. In block 320, the target CMDB gets the latest image for the BSCI. Then, in block 322, a VM instance is started. An instance configuration is determined for the VM instance in block 324. A determination is made as to whether the instance is current in block 326. If it is current, nothing need be done. If it is not current, the latest BSCI is retrieved in block 328, and an update is executed in block 330.

Figure 5:
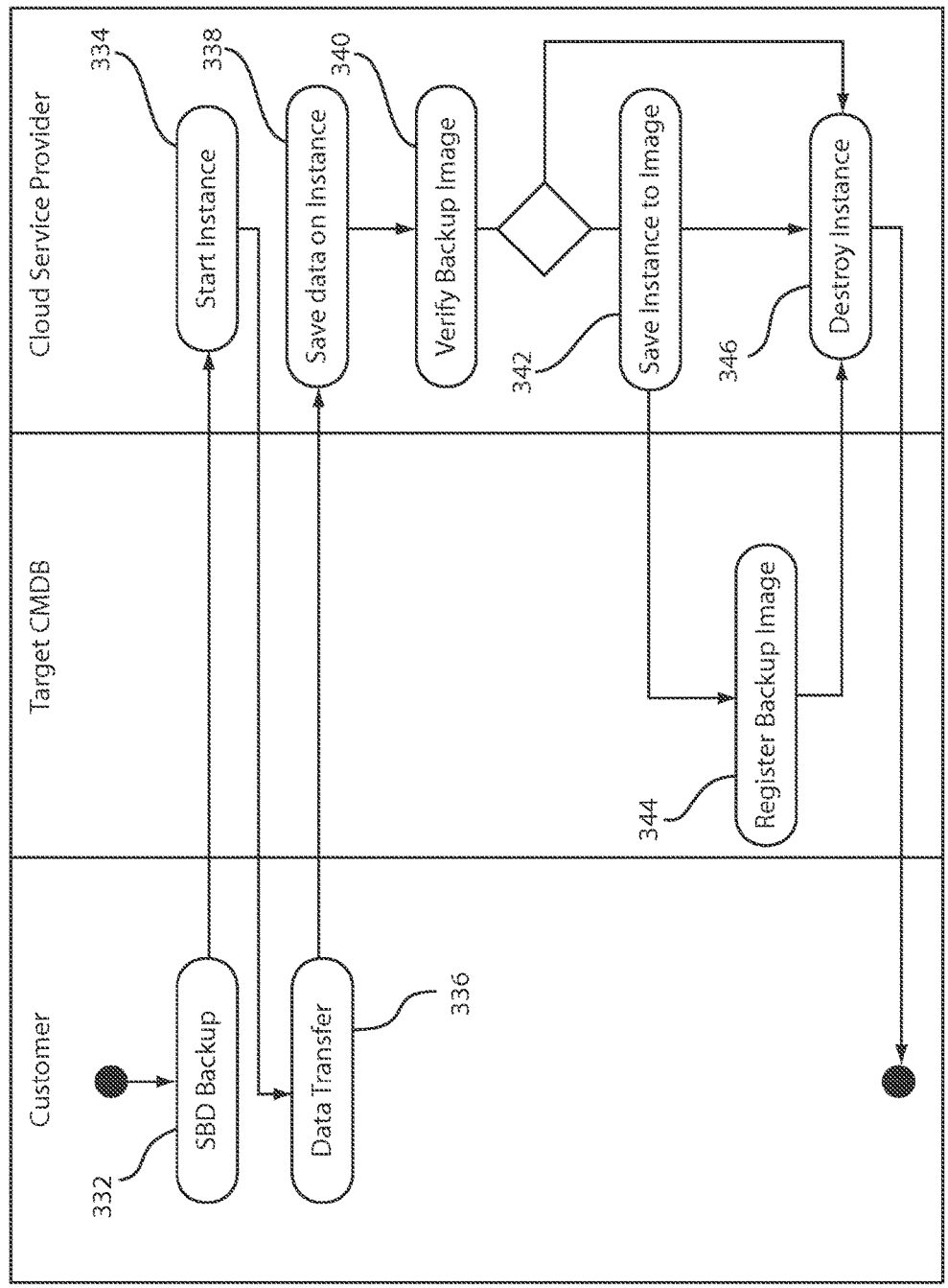
FIG. 5 is a block/flow diagram showing an illustrative method for carrying out SBD backup in accordance with one example.

Referring to FIG. 5, a SBD Backup Process 308 is illustratively depicted. The SBD Backup process is scheduled according to the established RPO. The customer production systems' backup agents take coordinated backups (checkpoints) and persist them to local backup storage. There are a number of parameters that the master backup agent should specify, such as: scheduling, full or incremental backup, file-system or SQL-based backup, compression and encryption, and the retention policy.

For the illustratively described scenario, we choose incremental, SQL-based database backups that are compressed and encrypted. This setup makes sense in particular for data centric applications such as a Web application that stores its entire SBD in a relational database. Using SQL-based instead of file system backups leads to a platform-independent backup-and-restore mechanism, and is generally recommended for database backups. We choose incremental backups since this is more efficient and has put smaller constraints than full backups on the bandwidth provided by a service provider. Compression and encryption is useful as it reduces the data transfer and provides security.

Every time a backup is taken by a Backup Service, a replica is allocated through the orchestration process at the cloud service provider. Then, the Backup Service is invoked to perform a verification procedure on the backup image.

In block 332, SBD backup is performed at the customer. The cloud service provider starts an instance in block 334. Data is transferred from the customer in block 336 and saved on the instance in block 338. The backup image is verified in block 340, and if verified, is saved to an image in block 342, and backed up in a register in block 344. If not verified or after being registered, the instance is destroyed in block 346.

Figure 6:
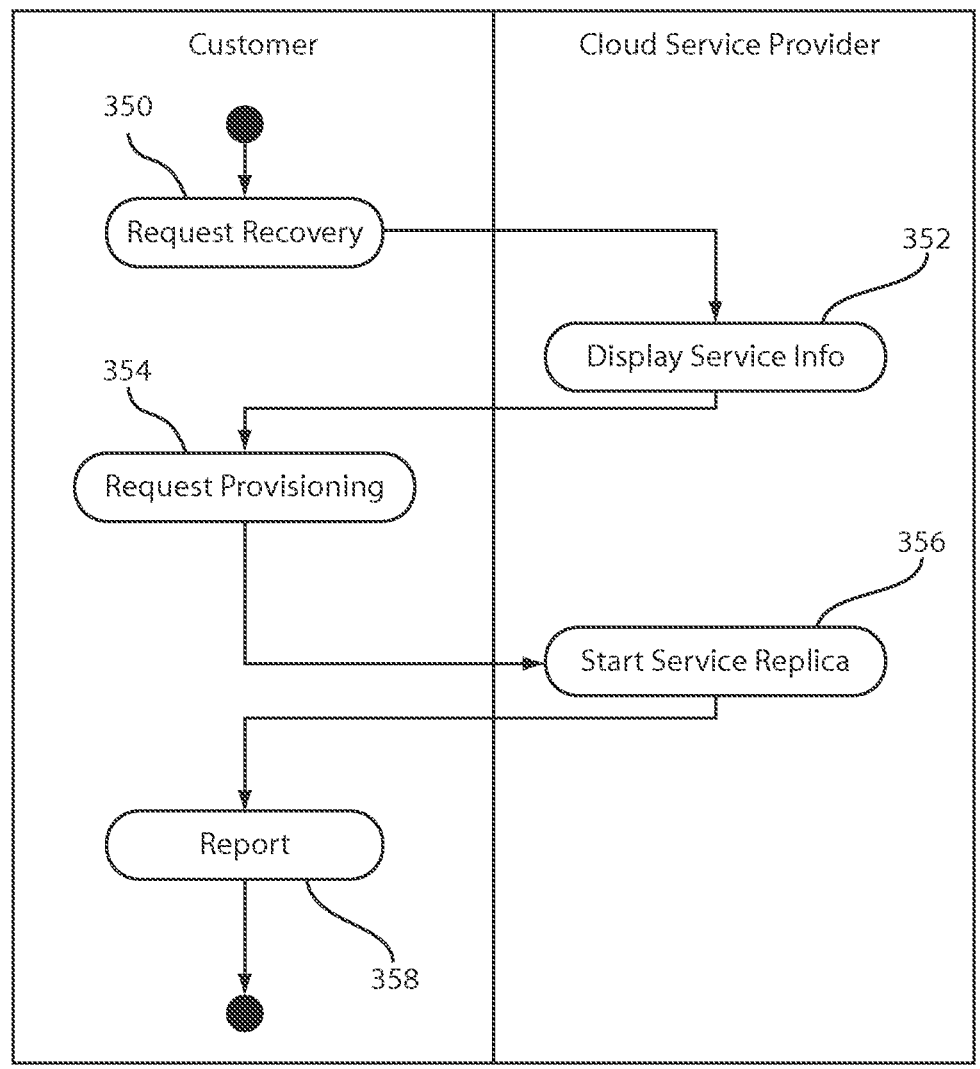
FIG. 6 is a block/flow diagram showing an illustrative method for carrying out invocation and recovery operations in accordance with one example.

Referring to FIG. 6, an Invocation and Recovery operation 208 is illustratively shown. The invocation of a DRP is facilitated either by disaster declaration or by a testing event. In both cases it assumed that at the time of declaration, access to the customer's site is limited, and the customer's business has a major service outage. The customer's management is alerted through existing business procedures.

They mandate the execution of an appropriate DRP. Invocation and Recovery processes include such activities as verifying and updating the currency of DRP, allocating and configuring required resources from hardware to services, requesting latest backup images, restoring latest backup SBD and verifying that the service replica is operational. In the present example scenario, all BSCI replication and SBD backup and restore activities are executed in the On-Going stage of the ITSCM lifecycle. Therefore the recovery activities include: request recovery, verify service replica information and start VM instances from the latest backup images.

In block 350, a request for recovery is made by the customer. In block 352, service information is displayed. In block 354, the customer requests provisioning from the cloud service provider. The cloud service provider then starts a service replica in block 356 and reports to the customers in block 358.

A new approach to deliver ITSCM through orchestrating cloud services, supporting services and people services has been described. The present approach is based on the separation of an IT service into Business Service Configuration Item (BSCI) and Service Business Data (SBD). This allows replicating BSCI on a VM image that is hosted by a cloud service provider and using file system or database backup and recovery mechanisms for the SBD. The present approach was evaluated against VM image-based ITSCM processes that utilize VM inventory control and live migration. Furthermore, estimated process execution times suggest that the present approach should be evaluated in a large scale scenario. Orchestrating backup and recovery of large numbers of IT services can be performed to prove the scalability of the suggested processes.

Figure 7:
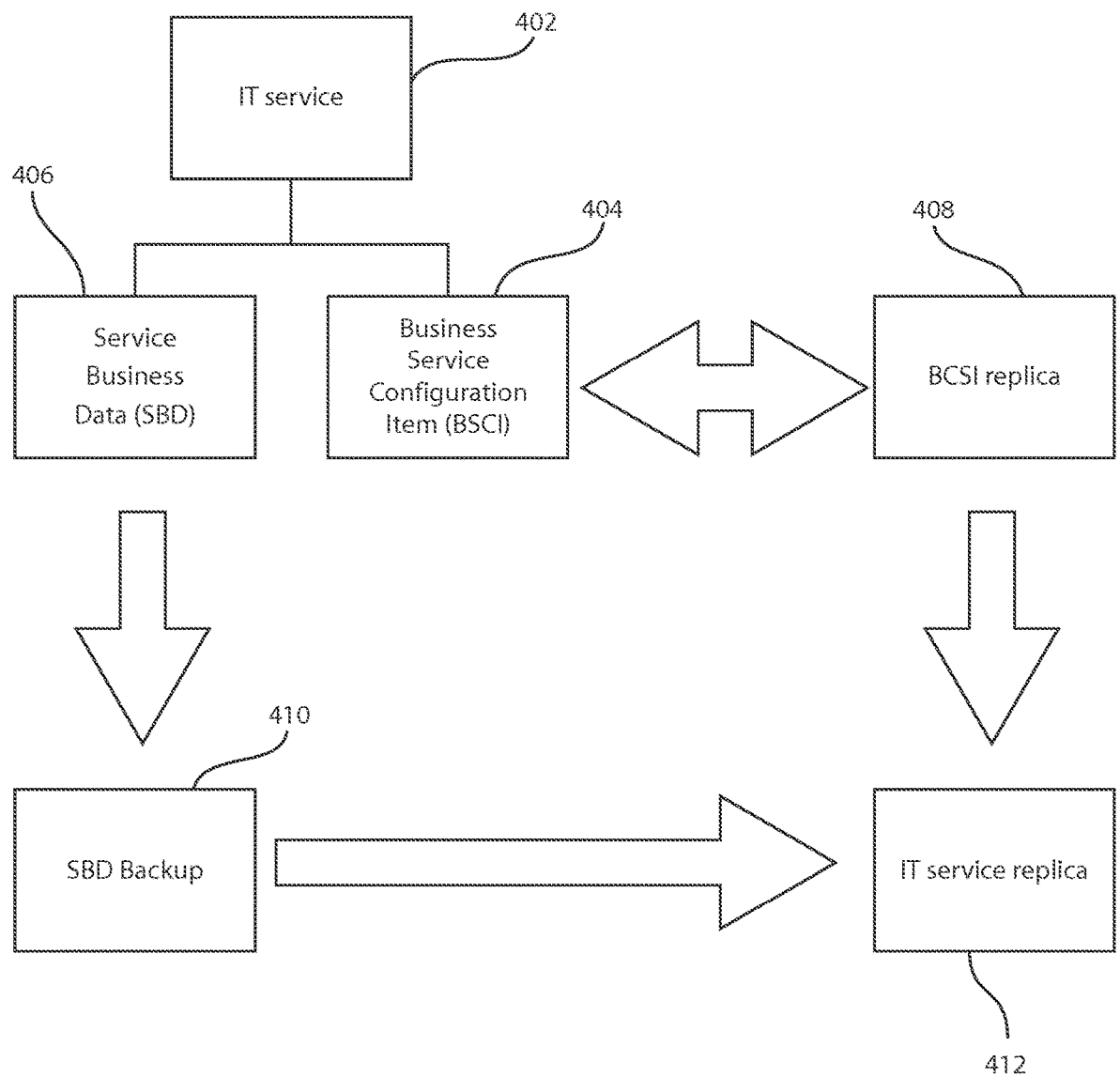
FIG. 7 is a block/flow diagram conceptually showing an embodiment for reducing latency time with cloud services in accordance with the present principles.

Referring to FIG. 7, an example for an IT service replication method is illustratively depicted. Cloud services provide access to basic resources (e.g., VM images with a Linux operating system (OS)). An IT service 402 is divided into an infrastructure management service in block 404 and data management service in block 406. An initial data store(s) is created and an initial set of infrastructure images are created on cloud(s) from one or more cloud provider(s). A first resource transformation prepares a "Base Service VM Image" or a BSCI replica 408 that is configured to host a replica of an IT service 402. A second resource transformation prepares a "Backup Server VM Image" of SBD backup in block 410 that coordinates and executes data backup and data restore processes. The recombination of the SBD backup and the BSCI replica provide an IT service replica 412.

On-going transformation of resources includes updating the "Base VM Image" 408 with new software configurations, patches, etc. and updating the "Backup Server VM Image" 410 with the backup schedules and (incremental) backup data. This results in resources being ready to use when a Service Recovery Workflow requests them. This also results in significantly less recovery time (latency) since up-to-date VM images are available with the appropriate data at the time of recovery, test initiation, etc.

Having described preferred embodiments of a system and method for reducing latency time with cloud services (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for reducing service latency, comprising:
    dividing an information technology service for a customer into an infrastructure management service and a data management service;
    storing data associated with the information technology service in a backup memory;
    storing a set of infrastructure images related to the information technology service at a cloud service provider;
    updating the set of infrastructure images related to the information technology service with software and hardware updates using backup and restore mechanisms of the infrastructure management service;
    updating the data associated with the information technology service using backup and restore mechanisms of the data management service; and
    starting the set of infrastructure images that has been updated with latest updates upon an occurrence of a triggering event, the triggering event being the updating of the data associated with the information technology service and a determination that the set of infrastructure images at the cloud service provider lacks the updated data in the set of infrastructure images.

2. The method as recited in claim 1, further comprising pushing updates to the set of infrastructure images from the customer to an infrastructure management service provider.

3. The method as recited in claim 2, further comprising establishing a mapping between configuration management of the customer and the cloud service provider such that the infrastructure management service provider is sensitive to updates for the set of infrastructure images.

4. The method as recited in claim 2, wherein the customer and the infrastructure management service provider employ resource management workflows that employ cloud services.

5. The method as recited in claim 4, wherein the resource management workflows are independent of the cloud service provider.

6. The method as recited in claim 1, further comprising employing a protocol based upon a Business Process Execution language (BPEL).

7. The method as recited in claim 1, further comprising pushing data in the backup memory to a target instance stored at the cloud service provider.

8. The method as recited in claim 1, further comprising managing access to the data to limit access by service providers and maintain the data securely.

9. The method as recited in claim 1, wherein the data includes service business data (SBD) and the set of infrastructure images include business service configuration items (BSCIs).

10. A computer readable storage medium comprising a computer readable program for reducing service latency, wherein the computer readable program when executed on a computer causes the computer to perform:
    dividing an information technology service for a customer into an infrastructure management service and a data management service;
    storing data associated with the information technology service in a backup memory;
    storing a set of infrastructure images related to the information technology service at a cloud service provider;

updating the set of infrastructure images related to the information technology service with software and hardware updates using backup and restore mechanisms of the infrastructure management service;

updating the data associated with the information technology service using backup and restore mechanisms of the data management service; and starting the set of infrastructure images that has been updated with latest updates upon an occurrence of a triggering event, the triggering event being the updating of the data associated with the information technology service and a determination that the set of infrastructure images at the cloud service provider lacks the updated data in the set of infrastructure images.

11. The computer readable storage medium as recited in claim 10, further comprising pushing updates to the set of infrastructure images from the customer to an infrastructure management service provider.

12. The computer readable storage medium as recited in claim 11, further comprising establishing a mapping between configuration management of the customer and the cloud service provider such that the infrastructure management service provider is sensitive to updates for the set of infrastructure images.

13. The computer readable storage medium as recited in claim 10, further comprising pushing data in the backup memory to a target instance stored at the cloud service provider.

14. A system for reducing service latency, comprising:

an information technology service for a customer being divided into an infrastructure management service and a data management service;

a backup memory for storing data associated with the information technology service;

a set of infrastructure images related to the information technology service being maintained at a cloud service provider, the set of infrastructure images being updated with software and hardware updates using backup and restore mechanisms of the infrastructure management service;

an updater configured to update data associated with the information technology service using backup and restore mechanisms of the data management service; and a service manager configured to start the set of infrastructure images that have been updated with latest updates upon an occurrence of a triggering event, the triggering event being the updating of the data associated with the information technology service and a determination that the set of infrastructure images at the cloud service provider lacks the updated data in the set of infrastructure images.

15. The system as recited in claim 14, further comprising a source configuration management database which pushes updates to the set of infrastructure images from the customer to a target configuration management database of an infrastructure management service provider.

16. The system as recited in claim 15, further comprising a mapping established and updated between the source configuration management database of the customer and the set of infrastructure images at the cloud service provider such that the infrastructure management service provider is sensitive to updates to the set for infrastructure images.

17. The system as recited in claim 15, wherein the customer and the infrastructure management service provider employ resource management workflows that employ cloud services.

18. The system as recited in claim 17, wherein the resource management workflows are independent of the cloud service provider.

19. The system as recited in claim 17, further comprising a protocol based upon a Business Process Execution language (BPEL) for executing the resource management workflows.

20. The system as recited in claim 14, wherein the data includes service business data (SBD) which is pushed to a target instance stored at the cloud service provider and the infrastructure images include business service configuration items (BSCIs) maintained at the cloud service provider.

* * * * *